March 26, 1968     H. M. ZIMMERMAN     3,374,906
BOTTOM TYPE SILO UNLOADER

Filed Jan. 6, 1966     4 Sheets-Sheet 1

Harold M. Zimmerman
INVENTOR.

BY *Clarence A.O'Brien*
and *Harvey B. Jacobson*
Attorneys

March 26, 1968  H. M. ZIMMERMAN  3,374,906
BOTTOM TYPE SILO UNLOADER
Filed Jan. 6, 1966  4 Sheets-Sheet 2

Harold M. Zimmerman
INVENTOR.

BY *Clarence A. O'Brien*
*and Harvey B. Jacobson*
Attorneys

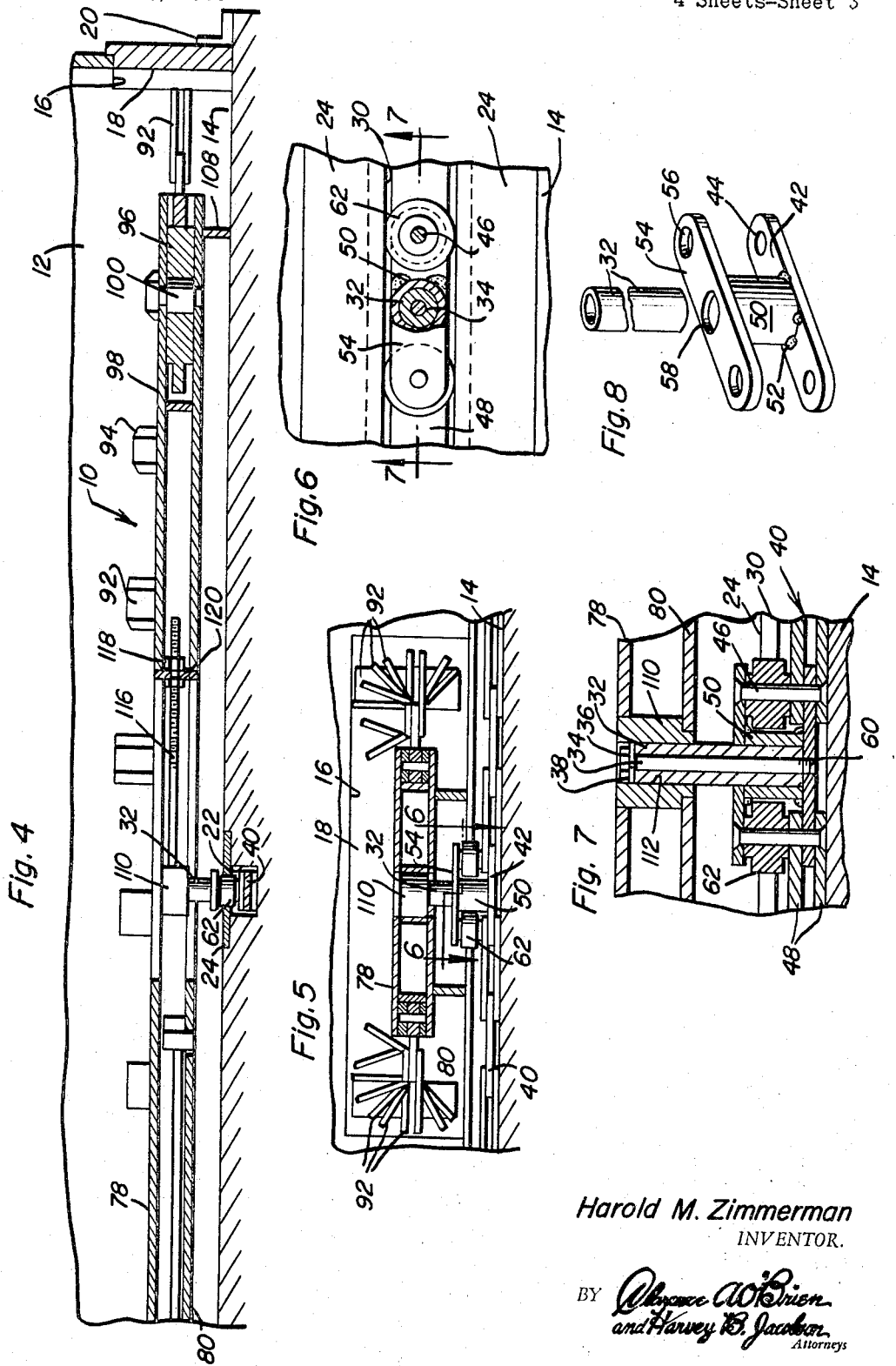

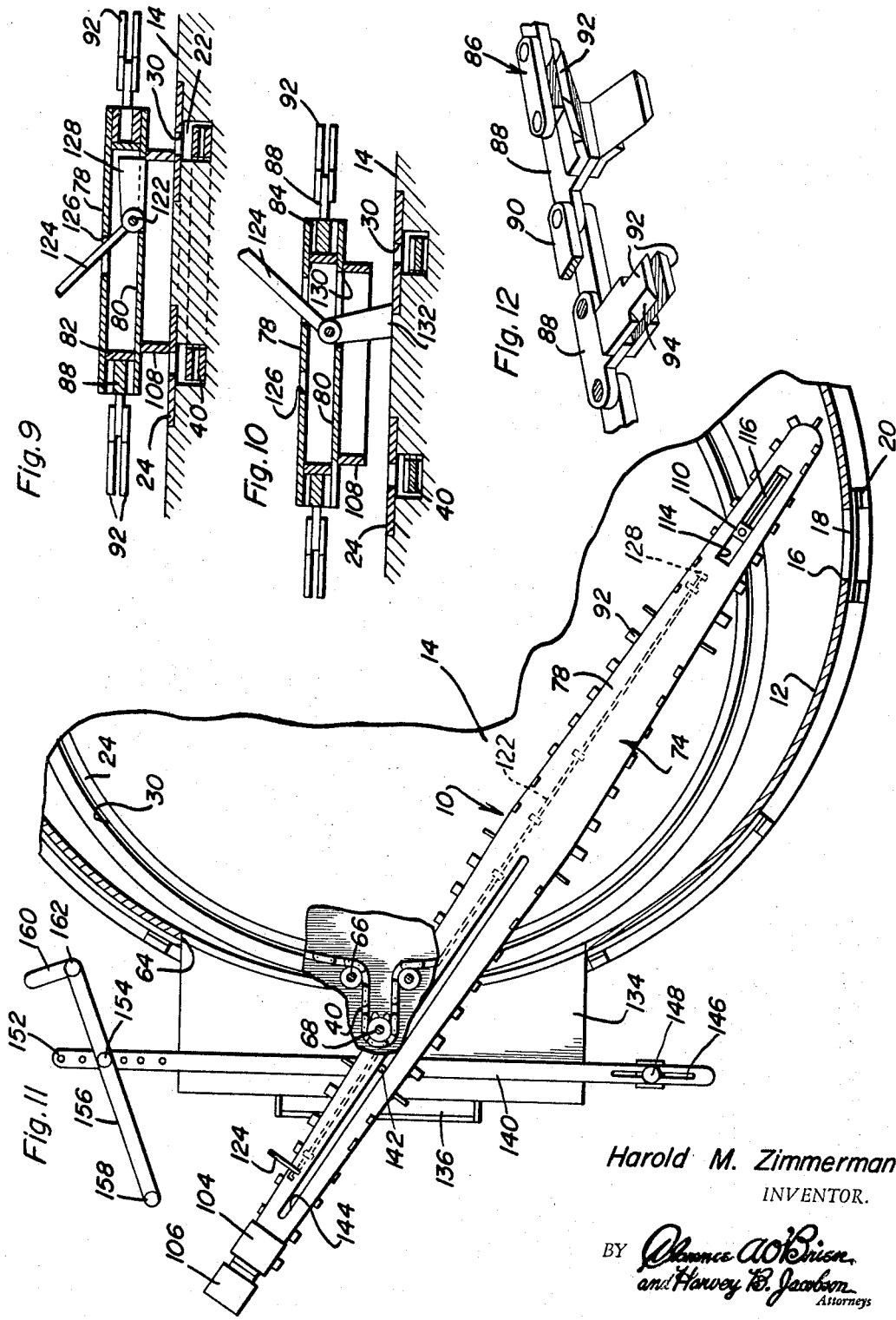

United States Patent Office 3,374,906
Patented Mar. 26, 1968

3,374,906
BOTTOM TYPE SILO UNLOADER
Harold M. Zimmerman, R.D. 1, Ephrata, Pa. 17522
Filed Jan. 6, 1966, Ser. No. 519,129
16 Claims. (Cl. 214—17)

ABSTRACT OF THE DISCLOSURE

A silo unloader for removing silage from the interior of a silo through an opening in a wall portion of the silo. The unloader includes the combination of an elongated conveyor, a drive mechanism for the conveyor, and means for moving one end portion of the conveyor horizontally orbitally with respect to the interior of the silo and for moving the conveyor horizontally reciprocally with respect to the opening in the wall portion of the silo. The conveyor cuts and conveys silage through the opening as it sweeps across at least a portion of the silo interior.

---

The present invention generally relates to a device for unloading a silo and more particularly such a device which unloads the silo from the bottom.

As is well-known, silos are employed for storage of various feed material for stock animals and the like and one of the problems which is encountered is the removal of the feed material from the silo so that it can be fed to the animals. Various devices have been provided for unloading silos from the top thereof and recent developments have involved structures for unloading the silo at the bottom which procedure has certain inherent advantages over the procedure of unloading from the top. Accordingly, it is an object of the present invention to provide a silo unloading device of a novel character which unloads the silo effectively from the bottom of the silo and discharges the feed material, broadly termed silage, exteriorly of the silo in a most expeditious manner.

All previously known bottom unloaders for silos have involved the use of a stationarily mounted conveying device which swings in a horizontal plane about a vertical axis generally coincidental with the center of the silo for discharging silage into an auxiliary conveyor located below the bottom of the silo so that the silage may then be conveyed exteriorly for use. However, such devices have various problems including a relatively complex drive mechanism, jamming of the swinging conveyor by the weight of the silage in the silo resting thereon and actual provision of a pit or orientation of the bottom of a silo at an elevated position in order to provide room for the auxiliary conveyors. Accordingly, it is another object of the present invention to provide a bottom silo unloader which involves a single conveying mechanism which will move the material from the top surface of the bottom of the silo directly laterally outwardly so that only a single conveying means is employed for taking the silage from the interior of the silo to the exterior thereof thus greatly simplifying the structure features of the above invention as well as the drive mechanism therefor.

A further important object of the present invention is to provide a bottom type silo unloader having a conveyor orientated on the bottom thereof which is movable in a horizontal plane by the use of a drive chain with the position of the conveyor being variable for enabling all areas of the silo to be reached by the conveyor but with all driving components of the conveyor itself and the conveyor moving chain being disposed exteriorly of the silo with the conveyor being capable of lateral and swinging movement in relation to the silo with one end thereof continuously disposed exteriorly of the silo for enabling variation of the position thereof and also enabling disconnection of the conveyor from the actuating chain so that the conveyor may be removed from the silo for use with other silos, repair, storage and the like.

Yet another important feature of this invention resides in the provision of a bottom type silo unloader having a driving chain moving the silage conveyor which is of the open chain type to any position in the bottom of the silo and enabling the conveyor to be fed into the silage in such a manner that it will not become jammed by the weight of the silage resting on the conveyor.

Still another feature of the invention resides in the simplicity of construction, ease of operation, efficiency, long lasting and durable qualities and its relatively inexpensive manufacturing and installation cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a detailed sectional view, on an enlarged scale, taken substantially upon a plane passing along section line 4—4 of FIGURE 1 illustrating the structure of the conveyor and the association of the drive chain therewith;

FIGURE 5 is a transverse, sectional view taken substantially upon a plane passing along section line 5—5 of FIGURE 1 illustrating further structural details of the conveyor and its association with the drive chain;

FIGURE 6 is a detailed, plan sectional view taken substantially upon a plane passing along section line 6—6 of FIGURE 5 illustrating the structural details of the driving chain and the guide track therefor;

FIGURE 7 is a detailed sectional view taken substantially upon a plane passing along section line 7—7 of FIGURE 6 illustrating further structural details of the drive chain and its association with the track and conveyor;

FIGURE 8 is an exploded group perspective view illustrating one link of the chain and the connector for connection with the drive chain;

FIGURE 9 is a transverse, sectional view, taken substantially upon a plane passing along section line 9—9 of FIGURE 1 illustrating the structural details of the drive chain, track and conveyor;

FIGURE 10 is a sectional view similar to FIGURE 9 illustrating the structure for elevating the conveyor in relation to the drive chain;

FIGURE 11 is a partial plan view similar to FIGURE 1 but illustrating the conveyor in an angulated position in relation to the silo with portions of the structure broken away; and FIGURE 12 is a perspective view of a portion of the conveyor chain illustrating the conveying fingers thereon.

Figure 1:
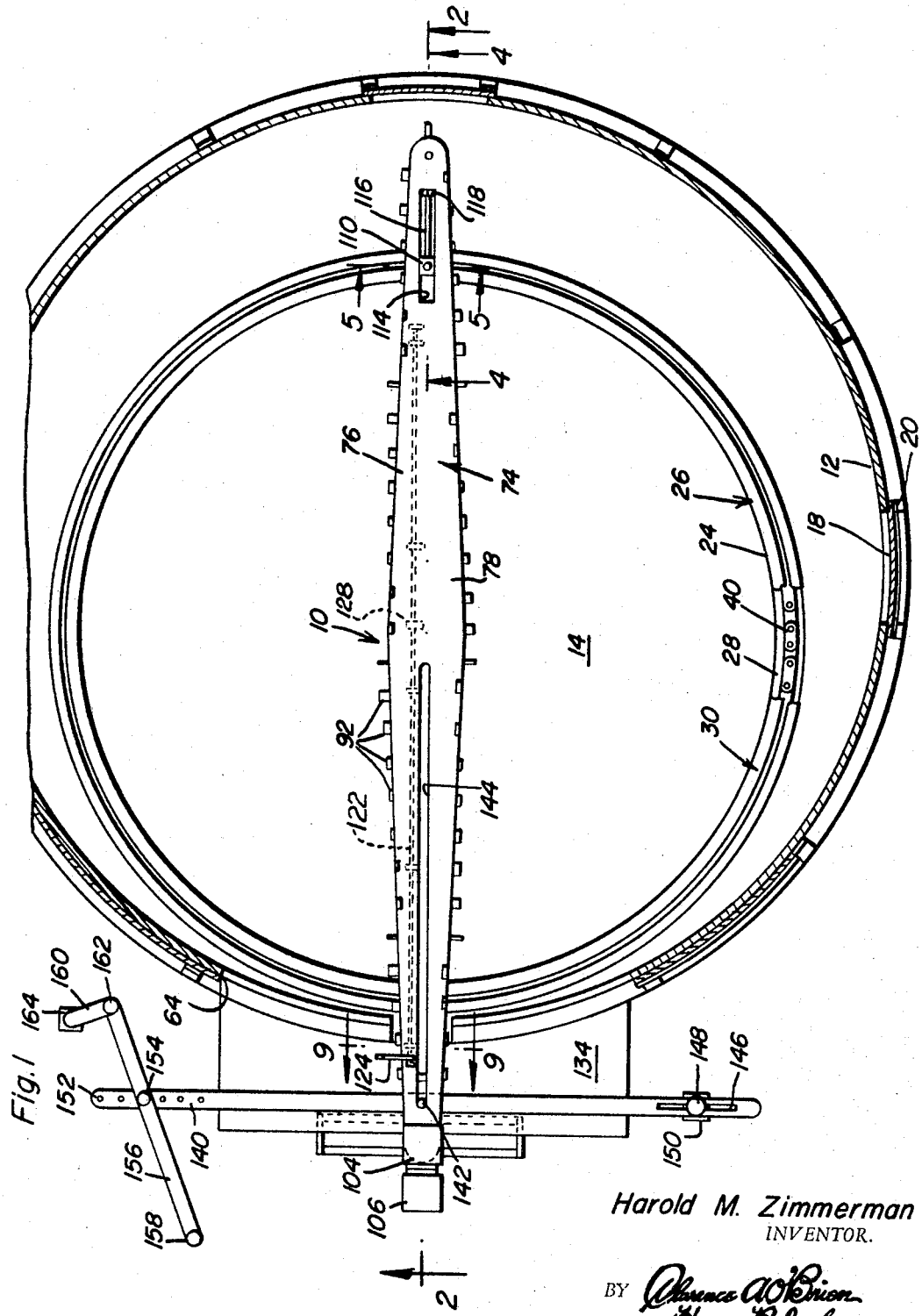
FIGURE 1 is a top plan view of the silo unloader of the present invention with components thereof broken away illustrating the structural details of the invention.

Referring now specifically to the drawings, the numeral 10 generally designates the silo unloader of the present invention which is disposed within the peripheral wall of a silo 12 having a floor or bottom 14 which may be of conventional structural materials. The peripheral wall of the silo 12 is provided with at least one opening 16 in the bottom thereof together with a closure plate 18 for the opening 16 which is retained in position by any suitable fastener means such as brackets 20 or the like. Preferably, a plurality of openings 16 and closures 18 will be provided in the peripheral wall of the silo to enable insertion of the conveyor from different positions and also to enable removal of portions of the conveyor in the event of breakage or the like.

While the conveyor 10 may be employed with various diameters of silos, it is also within the purview of this invention to employ two conveyors, one from either side of the silo in the event a silo of extra large diameter is provided in which event the structure described in detail hereinafter will be duplicated at opposite sides of the silo.

The floor or bottom 14 of the silo is provided with a continuous recess, groove, or channel 22 defined in the upper surface of the bottom 14 with a pair of spaced plates 24 forming a partial closure for the groove 22 and defining a guide trackway or groove. The trackway is generally designated by the numeral 26 and the plates 24 are flush with the bottom 14 by virtue of being received in recesses 28 and the slot between the plates is designated by the numeral 30 which forms a guide for an actuating pin 32 in the form of a sleeve mounted on a retaining bolt 34 which has a polygonal head 36 engaging a washer 38 in contact with the upper end of the sleeve 32. The drive or actuating pin 32 is received in and carried by a drive chain generally designated by numeral 40 which is received in the recess 22 and is a conventional link chain. One of the chain links is in the form of a plate 42 having rounded ends and apertures 44 for receiving fastener pins 46 which are elongated and extend up through the double plates 48 which sandwich the plate 42 therebetween.

The upper surface of the single plate 42 is provided with a tubular spacer 50 secured thereto as by welding 52 or the like. Across the upper end of the spacer 50, a plate 54 is attached by suitable welding or the like with the plate 54 being parallel to and in spaced relation to the plate 42 and having apertures 66 therein receiving the upper ends of the pins 46. The plate 54 has a central opening 58 therein which receives the actuating pin 52 so that it extends down through the plate 54, through the spacer 50 and abuts against the upper surface of the plate 42. The bolt 34 has a threaded lower end portion 60 which is threaded into a correspondingly internally threaded aperture in the lower plate 42 as illustrated in FIGURE 7.

The plate 54 is orientated above plates 24 of the trackway 26 and the pin 46 extend above the plates 24. Mounted on each of the pins 46 is a roller 62 which is disposed in the groove 30 and engages both edges of the spaced plate 24 as illustrated in FIGURES 6 and 7.

Where the trackway 26 extends out through an enlarged opening 64 in the silo wall 12, the spaced ends thereof are provided with guide rollers 66 which may be smooth surfaced or sprocket rollers. Thus, a portion of the chain 40 extends laterally outwardly and passes over a drive sprocket 68 carried by a suitable shaft 70 powered by a motor 72 which may be any suitable type of motor such as a hydraulic motor, electric motor or the like.

Thus, by operating the motor 72, the drive chain 40 with the actuating pin 32 thereon will be moved around the trackway 26. While the trackway 26 is illustrated generally of circular configuration, it is pointed out that it may be of any suitable configuration to enable the complete surface area of the bottom of the silo to be engaged by the unloader and in the event a large silo is provided, the trackway may be adapted for enabling the use of a separate unloader extending inwardly from opposite sides of the silo.

Mounted on and carried by the drive pin 32 is a conveying structure generally designated by numeral 74 which includes an elongated blade-like structure 76 constructed of a top plate 78 and a bottom plate 80 interconnected by a spacer 82 extending peripherally thereof and forming an outwardly opening trackway or groove 84 for receiving a conveying link chain 86 which has alternating single links 88 and double links 90 which represents a conventional link chain.

Figure 2:
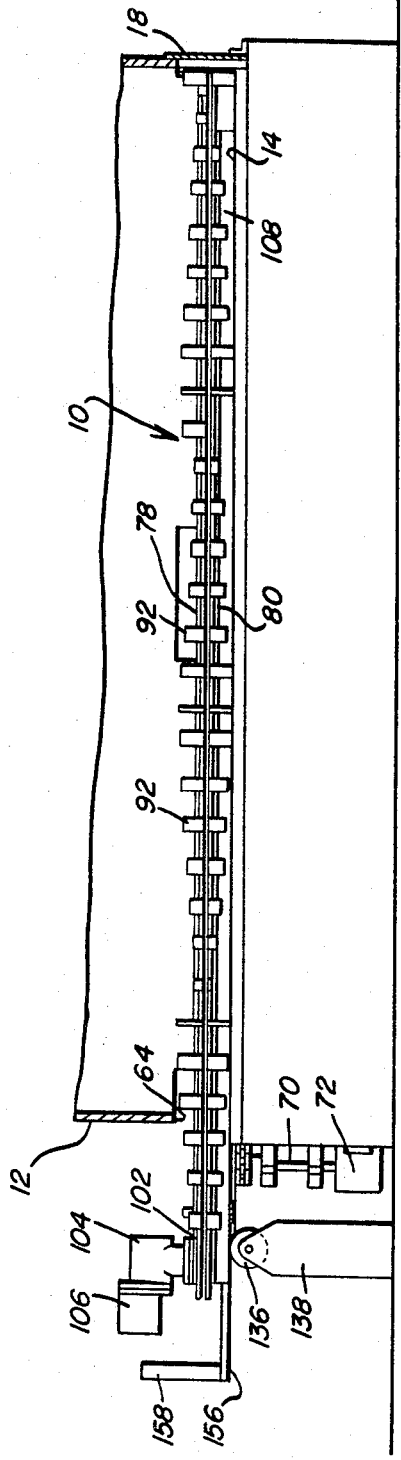
FIGURE 2 is a transverse, sectional view taken substantially upon a plane passing along section line 2—2 illustrating the silo unloader in elevation.
Figure 3:
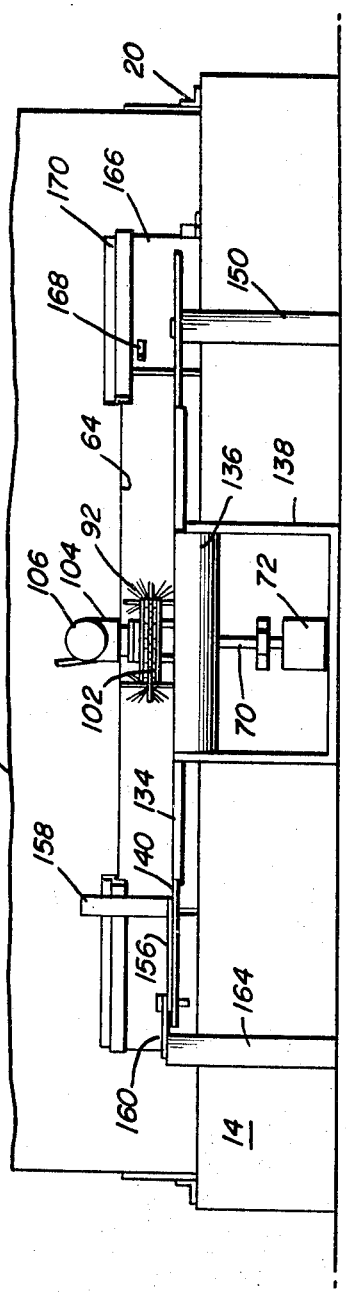
FIGURE 3 is an end view of the silo unloader as observed from the exterior of the silo.

As illustrated in FIGURE 12, the single links 88 have laterally projecting blades or fingers 92 thereon which are bevelled at the forward and rear edge thereof as at 94 to form cutting edges for cutting the silage as well as racking the silage peripherally of the blade 76 thereby conveying the material from the end of the conveyor 74 outwardly of the opening 64 in the silo wall 12. The position of the fingers or blades 92 vary as to the degree of vertical dimensions covered by the blades for cutting a relatively wide cut of silage. As illustrated in FIGURES 2 and 3, the blades 92 vary from substantially parallel position to a diverging position which may be substantially vertical or even in some instances may incline inwardly over the top of the edge portions of the top plate 78 thus serving to cut any desired contour of groove into the silage. By sharpening the blades 92 on both edges, the chain 86 may be driven in either direction.

The inner end of the chain 86 is entrained over a sprocket gear 96 carried by a movable plate assembly 98 having a shaft 100 supported thereon. The plate assembly 98 may be a continuation of the plates 78 and 80 or may involve a removable component to enable replacement or repair of the sprocket 96 and the shaft 100. The other end of the conveyor 74 is disposed exteriorly of the silo wall 12 and the chain 86 is entrained over a drive sprocket gear 102 that is fixed to the output shaft of a gear box 104 that has the input thereof connected with a suitable motor 106 which may be a hydraulic motor, electric motor or any other suitable power source for driving the sprocket gear 102 thus driving the chain 86 in either direction.

The conveyor 74 is supported by a depending flange 108 which extends downwardly from the bottom plate 80 around the periphery thereof and the flange 108 rests against and slides on the bottom 14 during movement of the conveyor 74.

A socket member 110 extends between the plates 78 and 80 and has a central bore 112 receiving the drive pin 32 for relative rotation and sliding vertical movement. The socket member 110 is slidably received in a slot 114 in the plates 78 and 80 and a threaded shaft 116 is attached thereto for adjustment longitudinally by a threaded end of the shaft 116 being provided with nuts 118 on either side of the transverse plate 120 interconnecting the top and bottom plates 78 and 80 as illustrated in FIGURE 4.

A structure is provided for elevating the conveyor 74 and is in the form of an elongated rod 122 journalled between the top plate 78 and the bottom plate 80 and extending longitudinally thereof. The end of the shaft 122 disposed outwardly of the silo is provided with a laterally extending handle 124 which extends upwardly through a slot 126 in the top plate 78. Mounted on the rod 122 at a plurality of longitudinally spaced points is a plurality of lift cams 128 which extends through slots 130 in the bottom plate 80 and have a flattened end surface 132 for engaging the bottom 14 for elevating the conveyor 74 as illustrated in FIGURE 9. The slot 126 is preferably of U-shaped configuration for providing a latch for retaining the handle 124 in both of its lateral positions. This enables the conveyor 74 to be elevated to increase the vertical dimension of the material being cut and is used primarily at night or when the unloader is not to be used for awhile which sometimes results in the silage descending onto the conveyor. Thus, the conveyor may then be lowered when subsequently used thereby eliminating any possibility of the conveyor becoming jammed, in the event silage falls downwardly onto the conveyor when the majority of the conveyor is disposed within the silo but will not disconnect the conveyor from the drive pin.

Disposed below the conveyor 74 and in alignment with the bottom edge of the opening 64 is an apron or plate-like structure 134 which forms a supporting surface for the material unloaded from the silo. A roller 136 supported by a suitable stand 138 may be provided at the outer edge of the plate-like structure 134 to assist in discharge of the ensilage and also serve as a support for the flange 108 when the conveyor 74 is moved outwardly of the silo.

A suitable trough or other conveying apparatus may be provided at the discharge end of the plate 134 or the roller 136 for receiving the silage discharged therefrom for conveying into a barn, feed bunk or the like.

Also, for supporting the conveyor 74, a transversely extending bar 140 is provided across the plate 134 with the bar 140 having an upstanding pin 142 rigid therewith received in longitudinal slots 144 in the top and bottom plates 78 and 80 for guiding the movement of the driven end of the conveyor 74. The bar 140 is provided with a slot 146 in one end thereof slidably engaged with a bolt-type fastener 148 or the like supported by a stand 150. The other end of the bar 178 is provided with a plurality of apertures 152 receiving a bolt 154 in a selected aperture 152. The bolt 154 also extends through an elongated actuating bar 156 having an upstanding handle 158 on one end thereof and having a supporting arm 160 pivotally attached to the other end thereof by a pivot point 162 with the arm 160 being supported by a suitable bracket 164 which may be in the form of a stand or the like thus enabling the handle 158 to be employed for manipulating the lateral position of the point 142 thus enabling the angular orientation of the conveyor 74 to be altered.

The opening 64 may be closed by sliding doors 166 having a suitable handle structure 168 incorporated thereon and an overlying lip 170 which provides a weather seal for the door 166 when it is closed.

The outer end portion of the conveyor may be supported by a suitable overhead type of boom with a hoist or the like being connected to the drive end of the conveyor thus facilitating the movement of the drive end of the conveyor. While it has been pointed out that various types of drive mechanisms may be employed, it has been found that an orbit hydraulic motor such as that disclosed in Patent No. Re. 25,291 manufactured by Char-Lynn Company of Minneapolis, Minn., is well adapted for the purposes of driving the drive chain as well as the conveyor chain with these motors being adjustable as to output speed and also reversible. The drive chain and also the conveyor chain are also of conventional construction but may be conventional sprocket chains such as manufactured by Chain Belt Company, Milwaukee, Wis., with, of course, the fingers 92 being formed on the single links or welded thereon as may be deemed appropriate for convenience.

The conveyor blade 76 and the chain thereon may be considered somewhat similar to a power chain saw as to the manner of operation thereof and the fingers thereon may be considered equivalent to the blades on the chain saw blade in that certain of the fingers or blades extend transversely of the path of movement to form drag blades while the others form cutter blades orientated at various angular orientations.

This structure, of course, enables the silo to be unloaded without disturbing the air-tight seal at the top end thereof and also retaining the bottom of the silo substantially in closed condition to reduce entry of air into the bottom of the silo. This will retain the silage therein substantially air free thus reducing spoilage and other detrimental effects of air contacting the silage within the silo.

When an extremely large silo is encountered, two of the conveyors and drive chain assemblies may be provided with the movement of the two conveyors being controlled by a central set of hydraulic controls. The trackway would normally be substantially semi-circular in orientation so that each of the conveyors would serve to convey material from approximately one-half of the large diameter silo. It is also pointed out that various lubrication fittings will be provided for lubricating the components of the unloader and adjustment may be provided for retaining the chains in a normal and desired taut condition. Also, the blade 74 is slightly wider at its center than at the ends thereof to facilitate initial digging of the silage at the central point for facilitating conveying of the silage longitudinally of the conveyor 74. Also, a hydraulic piston and cylinder assembly may be employed for shifting the outer end of the conveyor laterally in lieu of the handle structure 156.

Various mechanisms may be provided for receiving the silage from the conveyor such as off-bearing belt-type or screw auger conveyors, manually operated carts, tractor drawn devices or the like so that the silage may be conveniently carried to the point of consumption by the animals.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A silo unloader for removing silage from the bottom of a silo comprising conveyor means adapted to extend laterally through a silo wall adjacent the bottom thereof, said conveyor means including a downwardly opening socket member mounted on said conveyor means, a drive chain adapted to extend interiorly of the silo along the bottom thereof, means including an upstanding drive pin mounted on the drive chain and detachably received in said socket member to interconnect the drive chain and the conveyor means for moving the conveyor means so that substantially the entire area of the interior of the silo will be traversed by the conveying means, means driving the drive chain, and means powering the conveyor means for discharging silage exteriorly of the silo, said socket member being longitudinally adjustably mounted with respect to said conveying means to vary the path of movement thereof.

2. A silo unloader for removing silage from the bottom of a silo comprising conveyor means including an elongated blade-like structure adapted to extend laterally both interiorly and exteriorly through a silo wall adjacent the bottom thereof, a drive chain adapted to extend interiorly of the silo along the bottom thereof, means interconnecting the drive chain and the conveyor means for moving the conveyor means so that substantially the entire area of the interior of the silo will be traversed by the conveyor means, means driving the drive chain, means powering the conveyor means for discharging silage exteriorly of the silo, and a guide pin mounted exteriorly of the silo, said blade-like structure including an elongated slot receiving the guide pin for guiding movement of the portion of the conveyor means extending exteriorly of the silo.

3. The structure as defined in claim 2 wherein said guide pin is mounted on a movable support member disposed exteriorly of the silo and being adjustable for varying the position of the conveyor means in relation to the silo during movement of the conveyor means by the drive means.

4. A silo unloader for removing silage from the bottom of a silo comprising conveyor means adapted to extend laterally through a silo wall adjacent the bottom thereof, said conveyor means including an elongated blade-like structure having a conveyor chain mounted thereon, a drive chain adapted to extend interiorly of the silo along the bottom thereof, means interconnecting the drive chain and the conveyor means for moving the conveyor means so that substantially the entire area of the interior of the silo will be traversed by the conveying means, means driving the drive chain, means powering the conveyor means for discharging silage exteriorly of the silo, and means cooperating with said conveyor means for elevating said blade-like structure in relation to the floor of a silo, said last-mentioned means including an elongated shaft mounted on said blade-like structure, a handle on one end of said shaft adapted to be disposed exteriorly of said silo, and a plurality of lifting cams mounted on said shaft adapted to engage the bottom of said silo for elevating the blade-like structure when swung to an operative position by manual manipulation of the handle.

5. A silo unloader for removing silage from the interior of a silo comprising in combination an elongated conveyor means adapted to extend horizontally both interiorly and exteriorly through an opening in a wall of the silo, an endless drive member disposed at least partially interiorly of the silo, means interconnecting said endless drive member and said conveyor means for moving the conveyor means so that a prescribed area of the interior of the silo will be traversed by at least a portion of said conveyor means, means driving said endless drive member, means powering said conveyor means for discharging silage exteriorly of said silo, and means for guiding the portion of said conveyor means extending exteriorly of said silo.

6. The combination defined in claim 5 wherein said conveyor means includes an elongated relatively narrow support structure and a conveyor chain mounted on said support structure, said conveyor chain carrying a plurality of projections thereon for engaging and cutting silage and moving the silage with the conveyor chain, and wherein said driving means for the conveyor means includes a motor supported by the support structure exteriorly of the silo and drivingly engaging the conveyor chain.

7. The combination defined in claim 5 wherein said combination further includes a trackway adapted to be fixed in relation to the silo to receive said endless member thereon, wherein said means driving said endless drive member is disposed exteriorly of the silo and moves the portion of said endless drive member within said silo in said trackway.

8. The combination defined in claim 5 wherein said means interconnecting said endless drive member and said conveyor means includes cooperating detachably connected members on said endless drive member and said conveyor means respectively.

9. The combination defined in claim 5 wherein said conveyor means includes a conveyor member having a plurality of blades thereon, certain of said blades having the forward and rear edges thereof beveled to form sharpened edges, said blades being disposed at various angular orientations for covering a relatively wide area, certain of said blades including a transversely extending surface for dragging cut silage out of the silo.

10. The combination defined in claim 5 further including closure means for an opening in the silo through which the conveyor means extends for restricting the inflow of air into the interior of the silo and enabling removal of silage from the silo without breaking the top seal on the silo thus reducing spoilage of the silage.

11. A silo unloader for removing silage from the interior of a silo through an opening in a wall portion, said silo unloader comprising, in combination:
(a) an elongated conveyor means adapted to extend through said opening and cut and convey silage from one end portion of said conveyor means toward the opposed end portion thereof;
(b) means to drive said conveyor means whereby when at least a portion of said conveyor means is within said silo, said silage is conveyed through said opening; and
(c) means for moving said one end portion of said conveyor means horizontally orbitally with respect to the interior of said silo and said conveyor means horizontally reciprocally with respect to said opening such that said conveyor means moves relatively further into and further out of said silo and said conveyor means sweeps across at least a portion of the interior of said silo.

12. The combination defined in claim 11 wherein said conveyor means includes an elongated relatively narrow support structure and a conveyor chain mounted on said support structure, said conveyor chain carrying a plurality of projections thereon for engaging and cutting silage and moving the silage with the conveyor chain, and wherein said driving means for the conveyor means includes a motor supported by the support structure exteriorly of the silo and drivingly engaging the conveyor chain.

13. The combination defined in claim 11 wherein said means for moving said conveyor means orbitally with respect to the interior of said silo includes an endless drive member, at least a portion of which is disposed within said silo, means to drive said endless drive member and a track-way disposed within said silo adapted to be fixed in relation to the silo to receive said endless drive member therein; said means for driving said endless drive member being disposed exteriorly of the silo and moving the portion of said endless drive member within said silo in said track-way.

14. The combination defined in claim 11 wherein said means for moving said conveyor means orbitally with respect to the interior of said silo includes an endless drive member and a means interconnecting said endless drive member to said conveyor means; and said interconnecting means includes cooperating detachably connected members on said endless drive member and said conveyor means respectively.

15. The combination defined in claim 11 wherein said conveyor means includes a conveyor member having a plurality of blades thereon, certain of said blades having the forward and rearward edges thereof bevelled to form sharpened edges, said blades being disposed at various angular orientations for covering a relatively wide area, certain of said blades including a transversely extending surface for dragging cut silage out of the silo.

16. The combination defined in claim 11 further including closure means for an opening in the silo through which the conveyor means extends for restricting the inflow of air into the interior of the silo and enabling removal of silage from the silo without breaking the top seal on the silo thus reducing spoilage of the silage.

References Cited

UNITED STATES PATENTS

| | | | |
|---|---|---|---|
| 3,017,045 | 1/1962 | Soehl et al. | 214—7 |
| 3,035,718 | 5/1962 | Behlen | 214—17 |
| 3,182,824 | 5/1965 | Schleich | 214—17 |

FOREIGN PATENTS 1,143,148   1/1963   Germany.

ROBERT G. SHERIDAN, *Primary Examiner.*